H. P. T. VAN KEUREN.
VALVE MECHANISM.
APPLICATION FILED SEPT. 20, 1911.
1,159,553.
Patented Nov. 9, 1915.
2 SHEETS—SHEET 1.
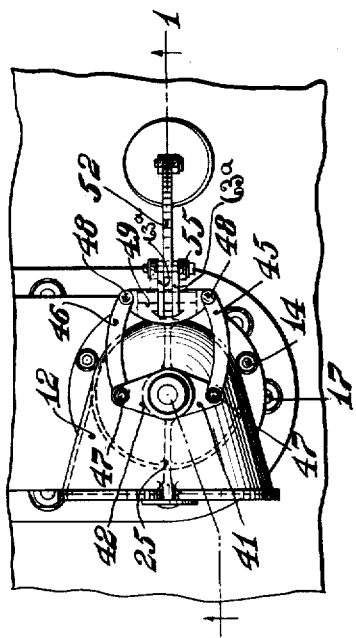
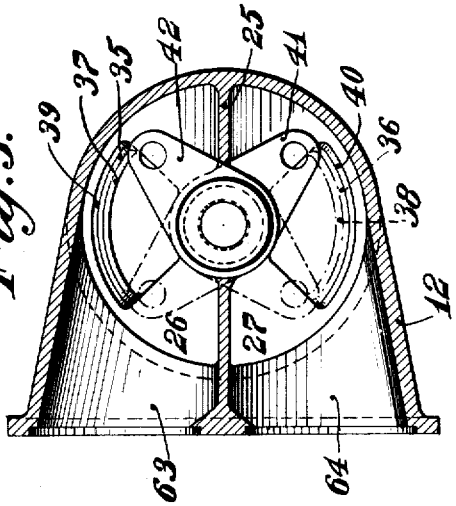
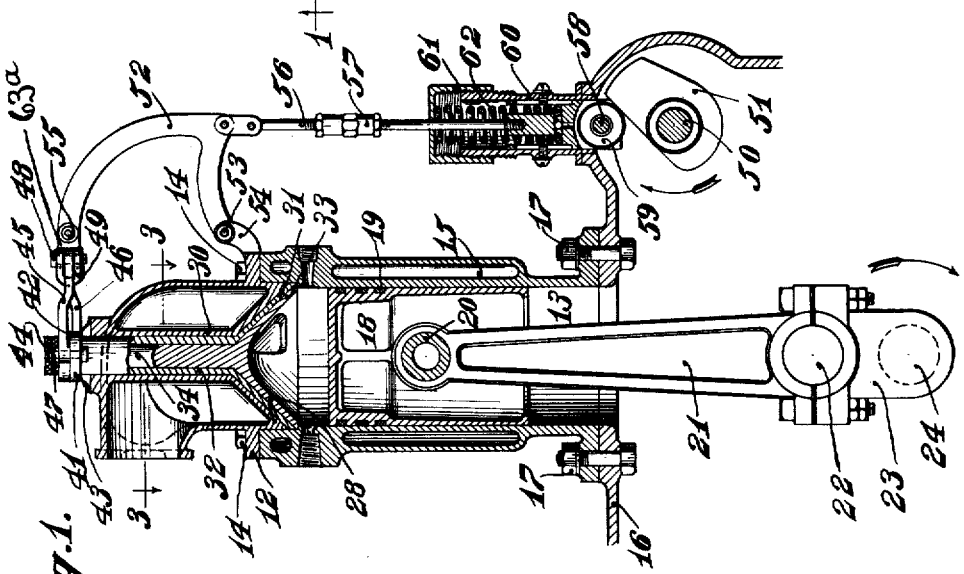
WITNESSES:
Mae Hofmann
George G. Ziegler
INVENTOR
Henry P. T. Van Keuren
BY
Jno T Croasdal
ATTORNEY.

H. P. T. VAN KEUREN.
VALVE MECHANISM.
APPLICATION FILED SEPT. 20, 1911.
1,159,553.
Patented Nov. 9, 1915.
2 SHEETS—SHEET 2.
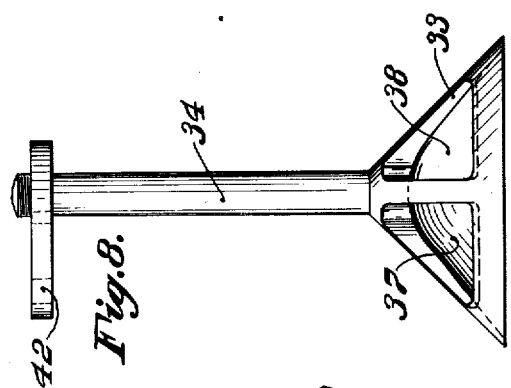
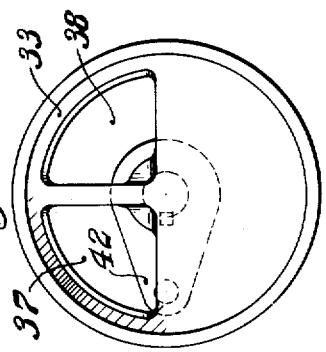
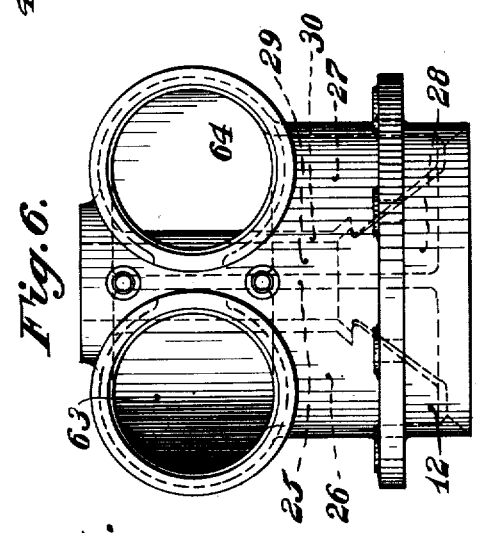
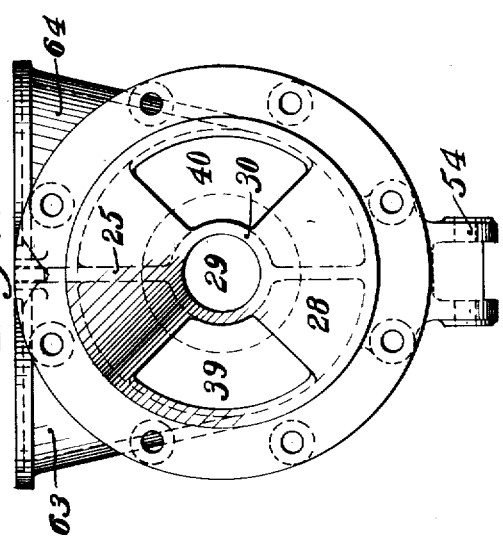
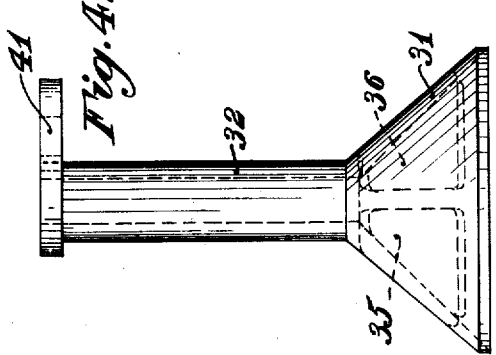
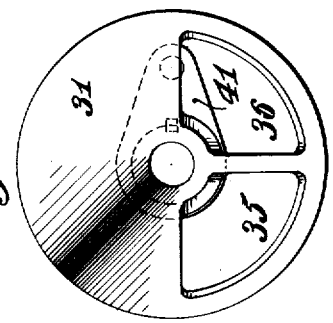
WITNESSES:
Mae Hofmann
George G. Ziegler
INVENTOR
Henry P. T. Van Keuren
BY
Ino Krousdal
ATTORNEY.

UNITED STATES PATENT OFFICE.

HENRY P. T. VAN KEUREN, OF PHILADELPHIA, PENNSYLVANIA, ASSIGNOR, BY DIRECT AND MESNE ASSIGNMENTS, TO JOHN C. ENGLISH, OF CAMDEN, NEW JERSEY.

VALVE MECHANISM.

1,159,553.     Specification of Letters Patent.     Patented Nov. 9, 1915.

Application filed September 20, 1911. Serial No. 650,308.

*To all whom it may concern:*

Be it known that I, HENRY P. T. VAN KEUREN, a citizen of the United States, residing at Philadelphia, in the county of Philadelphia, State of Pennsylvania, have invented a new and useful Valve Mechanism, of which the following is a specification.

My invention relates to valve mechanism for engines.

The object is to provide improved means for the admission of the expansive force to the cylinders, for the retention of the same therein during compression or expansion and for the expulsion of the spent products therefrom.

My invention comprises means whereby the intake and exhaust of the engine are made through a system of rapidly moving sliding ports disclosing a fixed port or ports. These ports are of relatively large extent and are adapted to open quickly transverse the direction of the flow of gas, vapor or the like and to remain wide open for a relatively long time. It will thus be understood that the restriction or obstruction of materials passing into or out of the cylinder will be reduced to a minimum and the operation of the engine rendered more efficient.

My invention comprises means for properly timing and operating said ports relatively to the operating parts of the engine and other details of construction.

Referring to the drawings which show a specific embodiment of my invention as applied to a four cycle gas engine such as is used in automobiles, Figure 1 is a vertical section on 1—1 of Fig. 2. Fig. 2 is a top view of same. Fig. 3 is a section on 3—3 of Fig. 1. Fig. 4 is a side elevation of the middle cone valve. Fig. 5 is a bottom view of same. Fig. 6 is a side elevation of the cylinder head casting. Fig. 7 is a bottom view of same. Fig. 8 is a side elevation of the inner cone valve. Fig. 9 is a bottom view of same.

Similar numerals refer to similar parts throughout the several views.

Referring to Fig. 1, the cylinder head casting 12 is held to cylinder 13 by stud bolts 14. The cylinder is provided with water jacket 15 and is tapped on the sides for a spark plug and a compression relief cock as shown. The cylinder is bolted to crank case 16 by bolts 17. Within the cylinder is provided piston 18 equipped with piston rings 19 and attached through piston pin 20 to connecting rod 21, which is connected by crank pin 22 and crank 23 to crank shaft 24.

Cylinder head casting 12 is fitted into a counter bore in cylinder 13 to enable water jacket 15 to be cast as part of the cylinder and yet project or extend past the valve members. Casting 12 is divided into two separate chambers by a vertical wall 25. The intake gas is led into chamber 26 through opening 63 and the exhaust gas is taken from chamber 27 through opening 64 and by means of proper connections to manifolds not shown. In the bottom of casting 12 there is provided a conical depression 28 terminating in a cylindrical opening 29, which extends through to the top of the casting and is surrounded by a cylindrical wall 30. Fitted into depression 28 is first a middle cone 31 with a hollow spindle 32 projecting through bore 29 of casting 12, and second an inner cone 33, inside of cone 31 and having a spindle 34 which projects through spindle 32.

Cone 31 is provided with adjacent openings or ports 35, 36, cone 33 with similar ports 37, 38 side by side on the opposite side of the cone from ports 35, 36 in cone 31, and casting 12 with ports 39 and 40 upon opposite sides thereof, one of said ports, 39, opening into chamber 26 and the other of said ports, 40, opening into chamber 27. The contact surfaces of these cones are all accurately ground and fitted. The relative proportions and positions of the respective cones and the openings therein are such that assuming the parts shown in Fig. 5 to superimpose the parts shown in Fig. 7 and the parts shown in Fig. 9 to superimpose the parts shown in Fig. 5, all in the positions as they are shown in said figures with their centers coinciding, openings 35, 36 and 37, 38 through the cone valves 31 and 33 respectively, are overlapped on the center lines of openings 39 and 40 in the cylinder head casting and said openings are closed. If, however, cones 31 and 33 are revolved 45° in opposite directions from the zero position above described, either intake port 39 or exhaust port 40 in casting 12 is opened singly, according to the direction of motion of cones 31 and 33. The total valve opening is the sum of the two 45° movements or 90°, and is accomplished at double the rate of movement of a single cone. It is obvious that if desired the construction may be varied to vary the amount of rotation of the valves necessary to control the flow between the intake passage 63 and the cylinder 13, and between the cylinder 13 and the exhaust passage 64. For example, assuming casting 12 to be provided with four ports of 45° each instead of with two ports of 90° as shown in the drawings, and corresponding openings of 45° each to be provided in the movable cones, a total valve opening of 90° will still be preserved but valves 31 and 33 now have a 22½° throw and the intake and exhaust gases pass in or out through two ports in each case instead of one. Other combinations are, of course, possible.

Referring now particularly to Figs. 1 and 2, it will be noted that the upper end of spindle 32, being the spindle of the middle cone valve 31, is seized by the horizontally disposed valve lever 41, while the upper end of spindle 34, being the spindle of the inner cone valve 33, is seized by valve lever 42 which projects in the opposite direction to lever 41. As levers 41 and 42 are loosely keyed to the two spindles the friction of the cone valves may be readily adjusted by means of disk spring 43, between the top of casting 12 and the under side of valve lever 41, and spanner nuts 44 threaded on the upper end of spindle 34.

Links 45 and 46 are secured to the outer ends of valve levers 41 and 42 respectively, by means of bolts 47. The other ends of links 45 and 46 are connected by pins 48 to opposite ends of yoke 49. It will be obvious that a forward or back movement of the yoke from its neutral or zero position will cause the rotation of cone valves 31 and 33 in opposite directions and the consequent opening and closing of ports 39 and 40 as above described.

Cam shaft 50, shown in Fig. 1, is preferably connected with crank shaft 24 by means of a chain and sprockets or a train of gears, not shown. The connection is such that the cam shaft is rotated in the same direction as the crank shaft and at half its speed. Rigidly connected to cam shaft 50 and rotating therewith is cam 51. The configuration of the cam is such as to cause proper valve movement at correct timing intervals. Bell crank lever 52 having its fulcrum center at pin 53 in bracket 54, is connected at one end through pin 55 with links 63ª, which are connected with yoke 49 as shown, and at its other end with plunger rod 56. Plunger rod 56 is made in two sections and is provided with nut 57 for convenience in adjustment. Secured to the lower end of the plunger rod by pin 58 is cam roller 59 adapted to coöperate with cam 51 on cam shaft 50. The lower end of the plunger rod reciprocates in hollow guide 60 rigidly connected to the crank case. Seated in guide cap 61 which is threaded to the top of guide 60, is spring 62 which surrounds the lower end of rod 56 and forces roller 59 to follow cam 51, all as clearly shown in Fig. 1.

The operation is as follows: In Fig. 1 piston 18 is shown at the limit of its upward stroke with crank 23 at its upper dead center ready for the downward or intake stroke. Roller 59 is ready to fall below or inside the cam pitch circle. As the engine turns over, piston, 18, roller 59 and rod 56 all move downward, arms 41 and 42 are drawn forward as shown by full lines in Fig. 3, and intake port 39 is opened by the rotation of the cone valve members as above described. When the piston has passed slightly back on the compression stroke or crank 23 is past the lower dead center, the cam roller and associated mechanism have closed intake port 39 by moving arms 41 and 42 backward, and now keep the valves closed since the roller now travels on the cam pitch circle and there is no valve movement. When the piston again reaches the limit of its upward movement the charge has been compressed to the maximum and at or near this point the spark occurs. As the compressed gas, ignited by the spark, expands and drives the piston downward on the impulse stroke the valves still remain closed, but before the lower dead center of the piston is reached, roller 59 rises above or outside of the cam pitch circle and causes exhaust port 40 to open, arms 41 and 42 being pressed back to the position shown by dotted lines in Fig. 3. Port 40 remains open during the exhaust stroke and as the piston reaches its upper dead center the port is closed and the cycle is completed.

It will be understood that the true area of the ports is considerably larger than the projected area shown in the drawings. It will also be understood that cam 51 pushes or causes the valves to open against the cylinder pressure at the beginning of the exhaust stroke, while the spring pulls or causes the valves to open against the intake pressure minus the exhaust pressure. Spring 62 thus works against practically no pressure except that due to the friction of the mechanism.

What I claim is:

1. In valve mechanism for an engine, the combination of a chambered member having a depression therein, and a cylindrical bore, and ports in the depressed portion of said member upon opposite sides thereof, a plurality of valve members within said depression having spindles projecting through said bore, said valve members each having adjaject ports therein upon opposite sides thereof and adapted to overlap the ports in said chambered member, and means for effecting relative horizontal movement between the chambered member and the valve members.

2. In valve mechanism for an internal combustion engine, the combination of a chambered member having a conical depression therein, and a cylindrical bore, and ports in said conical depression upon opposite sides thereof, a plurality of cone valves within said depression having spindles projecting through said bore, said cone valves each having adjacent ports therein upon opposite sides thereof and adapted to overlap the ports in said chambered member, and means connected with the spindles for moving the cone valves.

3. In valve mechanism for an internal combustion engine, the combination of a chambered member provided with a conical bearing face having intake and exhaust ports therein, a plurality of coöperating cone valves having openings therein adapted to register with said ports, and cam actuated means operating relatively to the operating parts of the engine, for effecting a simultaneous horizontal movement of said valves toward a common point to open or close communication through said ports.

4. In valve mechanism for an engine, the combination of a stationary casing having a fixed port therein, horizontally and intermittently oscillating valve members within said casing having ports therein adapted to be moved toward and away from said fixed port, and a cam actuated bell crank operatively connected with said valve members and with the operating parts of the engine.

5. In valve mechanism for an engine, the combination of a stationary casing having fixed intake and discharge ports therein, horizontally oscillating valve members within said casing having ports therein adapted to be oscillated toward and away from said fixed ports, said valve members provided with spindles projecting through the stationary casing, oppositely disposed arms connected with said spindles, a yoke connected with said arms, lever mechanism connected with the yoke, and a cam actuated spring controlled roller operatively connected with the lever mechanism.

6. In valve mechanism for an internal combustion engine, the combination of a casing having inlet and exhaust ports therein, valve members, one within the other, surrounded by said casing, said valve members provided with ports and having extensions projecting through the casing, and means connected with said extensions for rotating the valve members to control communication with the casing through the inlet and exhaust ports, and spring controlled means for adjusting the friction between the valve members and between the outer valve member and the casing.

7. In valve mechanism for an internal combustion engine, the combination of a casing having a bearing face having intake and exhaust ports therein, coöperating valve members having bearing faces and openings therein, and means for effecting at intervals the simultaneous oscillation of said valve members in opposite directions, the parts being so proportioned and positioned relatively that the valve members will normally overlap the intake and exhaust ports and the openings in said members may be moved toward either of said ports to permit communication therethrough, without permitting communication through the other of said ports.

8. In valve mechanism for an internal combustion engine, the combination of a casing having a bearing face having intake and exhaust ports therein, a plurality of coöperating valve members having bearing faces and openings therein, and cam actuated mechanism for oscillating said valve members toward a common point, the parts being so proportioned and positioned relatively that the valve members will normally overlap the intake and exhaust ports and the openings in said members may be moved toward either of said members or reversed to permit or prevent communication therethrough, without permitting communication through the other of said ports.

9. In valve mechanism for an internal combustion engine, the combination of a casing having a bearing face having intake and exhaust ports therein, coöperating valve members adapted to close said ports at one time, and at another time to be simultaneously moved horizontally through partial revolutions in opposite directions, toward or away from a common point, and means for adjusting the friction between the valve members.

10. In a valve for an internal combustion engine, the combination of a plurality of coöperating bodies having conical, concentric contact faces having coöperating ports or openings therein, one of said faces being fixed and another of said faces having operative relationship with the operating parts of the engine and adapted to be oscillated about the axis of the fixed face, and means for adjusting the friction between said fixed and movable faces the parts being so proportioned and positioned relatively that at certain times gas may pass through the ports or openings in said contact faces from a region excluded without one of said bodies to a region included within the same.

11. In valve mechanism for an engine, the combination with a cylinder, of a casing having a fixed port therein, and a plurality of oscillating cone valve members coöperating therewith to control said port, said valve members having a dwell in the closed position.

12. Valve mechanism for an engine, comprising the combination with a casing provided with an inlet port and an exhaust port, of a plurality of coöperating conical valve members for controlling said ports, and means for oscillating said valve members simultaneously and intermittently in opposite directions and reversing said oscillatory movement, to move their apertures simultaneously into and out of alinement consecutively with said ports to open and close the same, said valve members being permitted to remain in a state of rest during a predetermined period in their cycle of operations and while said ports are closed.

13. Valve mechanism for an engine, comprising the combination with a casing provided with an inlet port and an exhaust port, of a plurality of coöperating valve members for controlling said ports, and means for simultaneously oscillating said valve members intermittently in opposite directions and reversing said oscillatory movement, first to open and close the inlet port and then to open and close the exhaust port, said valve members being permitted to remain in a state of rest during a predetermined period in their cycle of operations to maintain said ports in a closed condition.

14. Valve mechanism for an engine, comprising the combination with a casing provided with inlet and exhaust ports of a plurality of coöperating horizontally movable valve members for controlling said ports, and means operatively connected with the operating parts of the engine for simultaneously oscillating said valve members in opposite directions and then reversing said simultaneous oscillatory movements to control communication through one of said ports, and then repeating said simultaneous oscillatory movements in inverse order, to control communication through the other of said ports.

15. The combination with means provided with a port, of two coöperating coaxial tapering valves arranged to control said port, and means arranged to oscillate said valves simultaneously in opposite directions respectively during the entire period of the opening of said port and the movements of said valves being then simultaneously arrested for an appreciable and predetermined period and then reversed and said valves being then oscillated simultaneously in opposite directions respectively during the entire period of the closing of said port.

16. The combination with means provided with a port, of two coaxial substantially conical valves coöperating to open or close said port, and means for oscillating said valves to open or close said port, said last mentioned means being operative to permit said valves to remain in a state of rest during predetermined and appreciable periods of their cycle of operations, and to oscillate said valves in opposite directions respectively during the entire period of the opening of said port, and to move said valves in opposite directions respectively during the entire period of the closing of said port.

HENRY P. T. VAN KEUREN.

Witnesses:
 EUGENE ZIEGLER,
 MAE HOFMANN.

It is hereby certified that in Letters Patent No. 1,159,553, granted November 9, 1915, upon the application of Henry P. T. Van Keuren, of Philadelphia, Pennsylvania, for an improvement in "Valve Mechanism," an error appears in the printed specification requiring correction as follows: Page 2, line 130, and page 3, line 1, claim 1, for the word "adjaject" read *adjacent;* and that the said Letters Patent should be read with this correction therein that the same may conform to the record of the case in the Patent Office.

Signed and sealed this 14th day of December, A. D., 1915.

[SEAL.]

R. F. WHITEHEAD,

*Acting Commissioner of Patents.*

Cl. 123—81.